(12) United States Patent
Berg et al.

(10) Patent No.: US 10,967,259 B1
(45) Date of Patent: Apr. 6, 2021

(54) ASYNCHRONOUS EVENT MANAGEMENT FOR HOSTED SESSIONS

(71) Applicant: Amazon Technologies, Inc., Reno, NV (US)

(72) Inventors: Karl Berg, Burnaby (CA); Alan Krause, San Diego, CA (US); Joseph Warren Pease, Carlsbad, CA (US); Neema Teymory, Vancouver (CA)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/981,511

(22) Filed: May 16, 2018

(51) Int. Cl.
*A63F 13/352* (2014.01)

(52) U.S. Cl.
CPC .................................. *A63F 13/352* (2014.09)

(58) Field of Classification Search
None
See application file for complete search history.

(56) References Cited

U.S. PATENT DOCUMENTS

| | | | | |
|---|---|---|---|---|
| 6,587,875 B1* | 7/2003 | Ogus | ....................... | H04L 47/10 709/223 |
| 6,845,389 B1* | 1/2005 | Sen | ......................... | A63F 13/12 709/204 |
| 10,531,165 B1* | 1/2020 | Evans | ................. | H04N 21/4781 |
| 2002/0119821 A1* | 8/2002 | Sen | ......................... | A63F 13/12 463/42 |
| 2004/0053674 A1* | 3/2004 | Nguyen | .............. | G07F 17/3202 463/20 |
| 2007/0202941 A1* | 8/2007 | Miltenberger | .......... | G07F 17/32 463/25 |
| 2009/0275414 A1* | 11/2009 | Lee | ......................... | A63F 13/12 463/42 |
| 2011/0300946 A1* | 12/2011 | Stafford | .................. | H04L 67/38 463/42 |
| 2012/0021823 A1* | 1/2012 | Youm | .................... | A63F 13/497 463/29 |
| 2012/0064968 A1* | 3/2012 | Youm | .................... | A63F 13/335 463/29 |
| 2012/0128010 A1* | 5/2012 | Huang | .................. | H04L 1/0009 370/468 |
| 2013/0260887 A1* | 10/2013 | Cahill | ................... | A63F 3/0423 463/42 |

(Continued)

*Primary Examiner* — Seng H Lim
(74) *Attorney, Agent, or Firm* — Hogan Lovells US LLP

(57) ABSTRACT

Authoritative management of application state can be provided for a large number of participants using a set of application servers. Each participant in an active session will communicate with only a specific application server, where that server will have authority over the state information for that participant. When input is received from a participant, the input is passed to the authoritative server for processing. The authoritative server performs a simulation based on the input as of the time indicated by respective timestamps, enabling the server to utilize rewind and replay semantics to enable events performed in the past on various clients to be accurately simulated on the authoritative server, dramatically reducing the perceived latency. Results of the simulation are sent to the other application servers having authority over the state information for other participants in the session for updating the state for those participants.

20 Claims, 8 Drawing Sheets

(56) References Cited

U.S. PATENT DOCUMENTS

| | | | |
|---|---|---|---|
| 2013/0260888 A1* | 10/2013 | Thornton | A63F 13/80 463/42 |
| 2014/0019520 A1* | 1/2014 | Milburn | H04L 65/4076 709/203 |
| 2014/0094313 A1* | 4/2014 | Watson | A63F 13/10 463/42 |
| 2014/0157246 A1* | 6/2014 | Tomlinson | G06F 8/47 717/140 |
| 2014/0194211 A1* | 7/2014 | Chimes | A63F 13/497 463/43 |
| 2014/0274415 A1* | 9/2014 | Benzon | A63F 13/338 463/42 |
| 2015/0012840 A1* | 1/2015 | Maldari | H04L 65/60 715/748 |
| 2016/0294921 A1* | 10/2016 | Meng | A63F 13/352 |
| 2017/0060645 A1* | 3/2017 | Gasselin de Richebourg | G06F 9/54 |
| 2017/0266568 A1* | 9/2017 | Lucas | A63F 13/77 |
| 2019/0321727 A1* | 10/2019 | Rodgers | A63F 13/335 |

\* cited by examiner

ASYNCHRONOUS EVENT MANAGEMENT FOR HOSTED SESSIONS

BACKGROUND

The widespread adoption of a variety of computing devices has resulted in a corresponding increase in the variety of applications available to users. For gaming applications, many of these games enable users to engage in online multiplayer games, which may be hosted by a central gaming server. For game environments with a large number of players, the player experience can be impacted by issues such as excessive latency. Since player input data must be communicated from each of the various player devices, at any of a number of potential locations, to the central gaming server, there can be significant delays in updating game state relating to the varying transmission times for the input data. This can result in game lag, jerkiness in the displayed game, irregularity in gameplay, or other such issues.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of hosted applications. In particular, various approaches provide for the authoritative management of game state for a number of different clients. Each client, or player device, participating in a game session will communicate with only one of a set of game servers for the session, where that server will have authority over the game state information for that player. As an example, any changes to the game properties for a particular player may only be modified by the authoritative server, and no other game server will be able to communicate directly to the client for that player. When game input is received from a given player, that information is passed to the authoritative server for processing. The authoritative server can perform a simulation of the game input as of the time indicated by one or more respective timestamps. This effectively enables the game servers to utilize rewind and replay semantics to enable game events performed hundreds of milliseconds in the past on various game clients to be accurately simulated on those game servers, dramatically reducing the perception of game latency. Results of the simulation can be used to update or modify the game state for that player. The authoritative server can also send calls including the result data to the other game servers. Since the servers are all in a trusted environment, the other game servers receiving the result data from the first server can trust the result data. The game servers receiving the result data can then update or modify the game state or parameters for players over which they have authority, and can propagate those changes as updated authoritative data to the other game servers, which can pass the information along to their respective clients or player devices.

Various other functions can be implemented within the various embodiments as well as discussed and suggested elsewhere herein.

Figure 1:
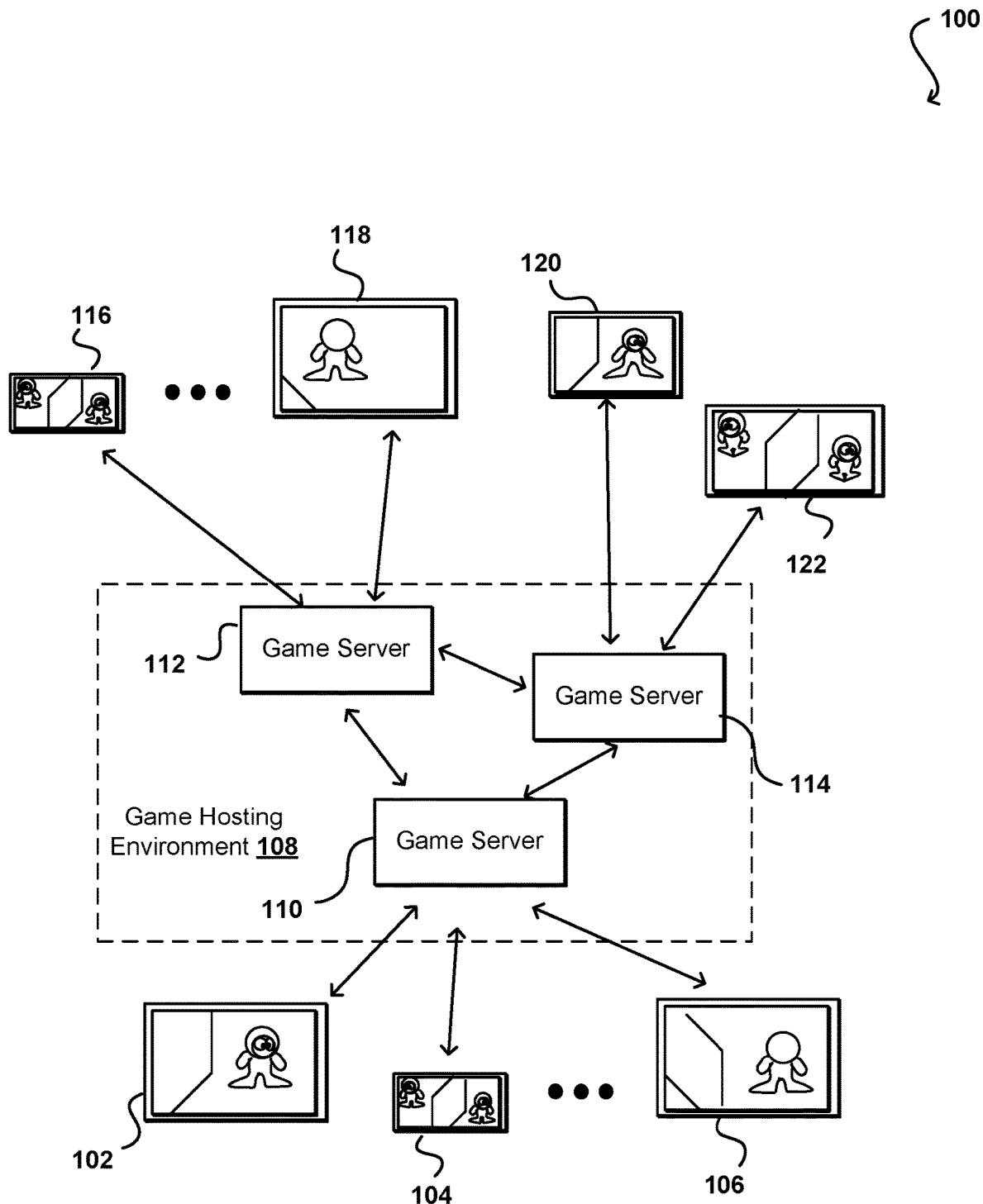
FIG. 1 illustrates devices joined in an example gameplay session for a multiplayer game that can be utilized in accordance with various embodiments.

FIG. 1 illustrates an example gaming configuration 100 that can be managed in accordance with various embodiments. Similar configurations can be utilized to support other types of applications as well as would be apparent to one of ordinary skill in the art in light of the teachings and suggestions contained herein. In this example, there are multiple player devices 102, 104, 106, 116, 118, 120, 122 participating in a multiplayer gaming session hosted by resources of a game hosting environment 108. The hosting can be performed using a set of game servers 110, 112, 114 each corresponding to software running on at least one processing instance, or other computing resource, offered through the game hosting environment 108, where the environment in some embodiments can correspond to a resource provider environment operated by an entity separate from a provider of the game software. The processing instances can be any appropriate type of processing resource, such as a physical or virtual server or machine instance as discussed elsewhere herein. A processing instance can store and execute code for various processes for an gaming session, such as to function as a game server for some or all players for an active game session, as may depend at least in part upon the number of active players and the capacity of the instances, among other such options. The player devices will transmit event data, such as may correspond to input of a player to a respective device, over at least one network 108 that is received and directed to an appropriate game server. If the game hosting environment is operated by an entity other than the game developer or publisher, the game developer/publisher might purchase an amount of resource capacity from the resource provider that can be provided using available capacity of a set of resources, which may be maintained in a pool 120 of resource capacity. As known for such purposes, a given physical machine may have unused portions of its capacity allocated to such a capacity pool. Each resource may be able to host multiple game sessions, and the allocation of those resources can be managed by a resource manager or other such component, process, or service as discussed in more detail elsewhere herein.

In this example the game offers multiplayer capability, whereby multiple players can utilize their respective devices to connect to an appropriate game server for the active game session. The devices can communicate over at least one network, such as the Internet, a local area network, a dedicated gaming network, a peer-to-peer network, or a cellular network, among other such options and combinations thereof. The player devices can join in a session of the game with state data that is managed by a game state component of the relevant game server. In some embodiments, players can join an existing session in process, and leave during the session, such that the number of players may vary over time. The player devices can include specific gaming devices, such as gaming consoles or handheld consoles, or other computing devices such as smart phones, tablet computers, wearable computers (e.g., smart glasses or watches), desktop or notebook computers, and the like. Event information can be transmitted from the player devices at appropriate times, such as periodically, in response to certain actions or occurrences in the game, in response to requests from the server, or at other appropriate times. The game server(s) can maintain the game state information such that the game state is consistent across the various player devices, as well as to enable a saving or restoring of the game for any or all of the devices.

In many instances, a player will submit a request to join a session of a specified gaming application supported by the game hosting environment. If there is an active game session for which the player qualifies, such as by having an appropriate skill level or qualification, then the player can be added to the existing game session. If there is no active game session for which the player qualifies, or if games can only be joined before the session starts, then the request can trigger the initiation of a new session for the game. If a resource is not already allocated for this session, then a new resource or resource instance can be selected, such as by a resource manager and from a resource pool, to host the gaming session. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server, such that the game state can be updated and propagated to the various player devices so the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

It might be the case that the game servers are located in different geographical or physical locations. The distance between the resource and the gaming devices can further impact the latency for the game session, which can have negative implications as discussed. Thus, it can be desirable in at least some situations to attempt to provide the capacity using resources that are relatively close to the players to the game, in order to minimize latency due to physical distance. It may not always be practical, however, to select the closest available resource capacity, however, as there may be other considerations relating to the selected resource. For example, different types of resource capacity can have different costs, and it may be cheaper for a developer to buy a fixed amount of capacity even though that capacity might not always be the closest to the potential players. Further, for a large number of player devices with a large diversity of locations it can be difficult to locate resources that are sufficiently close to the various players.

Accordingly, approaches in accordance with various embodiments can take advantage of multiple game servers that work together to manage a single game environment that is able to support a large number of players with minimal impact on gameplay due to latency and other such issues. The number of players considered to be a "large" number will vary by application and types of resources, as well as over time, but for current games can be considered to include thousands of concurrent players participating in a single game session, such as for massively multiplayer online role-playing games (MMORPGs) and other large environment games. In FIG. 1 it can be seen that there are multiple game servers 110, 112, 114 that are each associated with a subset of player devices that are active or participating in an active game session hosted by those game servers. The game servers can each execute the gaming application, and can each be responsible for managing game state for their respective subset of player devices. The player devices can be assigned to game servers based on factors such as geographic location, capacity, and network conditions, in order to attempt to minimize latency of communications between the devices and the relevant game servers. Each player device will then communicate with only one of the game servers, which has authority for the game state for that device. When an event occurs on one 102 of the player devices, such as in response to user input to the device that corresponds to the game session, event data including information for the input can be transmitted from the player device 102 to the respective game server 110. That game server 110 can then be responsible for transmitting data for the event to the other game servers 112, 114 so that they have authoritative data corresponding to the event. These servers can similarly send event data from their respective devices to the first game server 110. In this way, all game servers have accurate game state data even though each individual game server only has authority over the state for a specific subset of devices for the game.

As mentioned, the transmitted event data can include timing information as well, as may take the form of a time stamp specifying a time at which the input was received. In this way, a game server receiving that information can simulate the event as of the time in which the input was received or the event generated. Since this will have been received for an event that already occurred on the respective client device, this will effectively enable each receiving game server to "rewind" time and cause the event to be simulated for the time at which it occurred on the respective player device. This can help to ensure accurate gameplay even in the presence of latency, as a determination such as a hit or collision can be determined for the state of the game at the time of the input, rather than at some time later resulting from the latency. While some games utilize predictions to account for latency, this can result in poor player experience when hits or collisions are counted or displayed based on predictions but the actual gameplay without latency would not have included such hits or collisions. Thus, a configuration such as that illustrated in FIG. 1 enables multiple game servers 110, 112, 114 to accurately manage game state while distributing authority for the various player devices.

Figure 2:
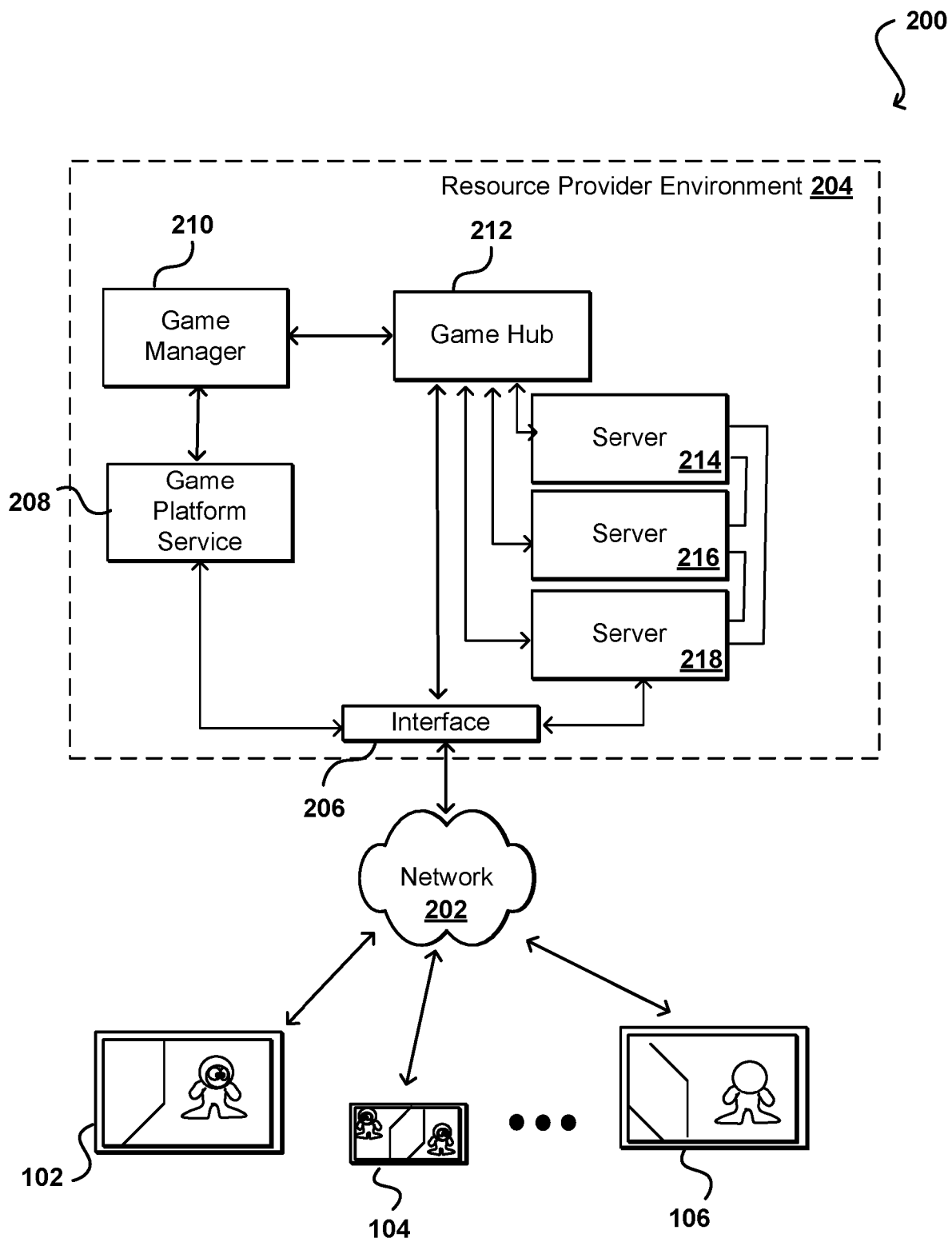
FIG. 2 illustrates an example system for authoritatively managing game state for multiple player devices that can be utilized in accordance with various embodiments.
Figure 3A:
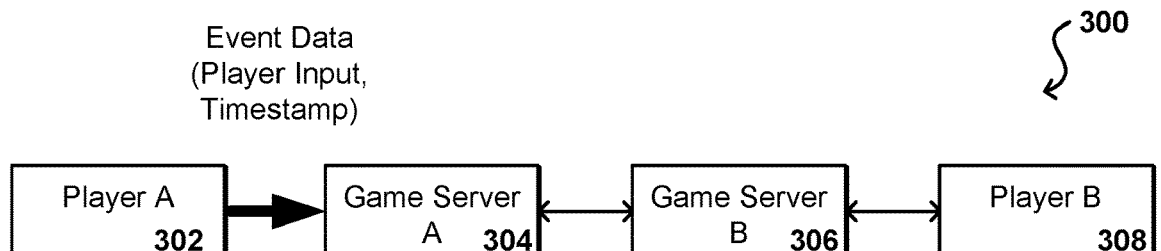
FIGS. 3A, 3B, 3C, 3D and 3E illustrate an example data flow for managing game state that can be utilized in accordance with various embodiments.
Figure 3B:
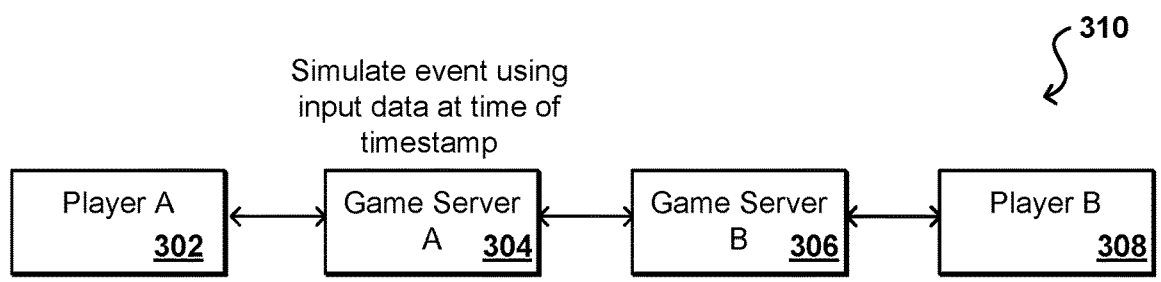
Figure 3C:
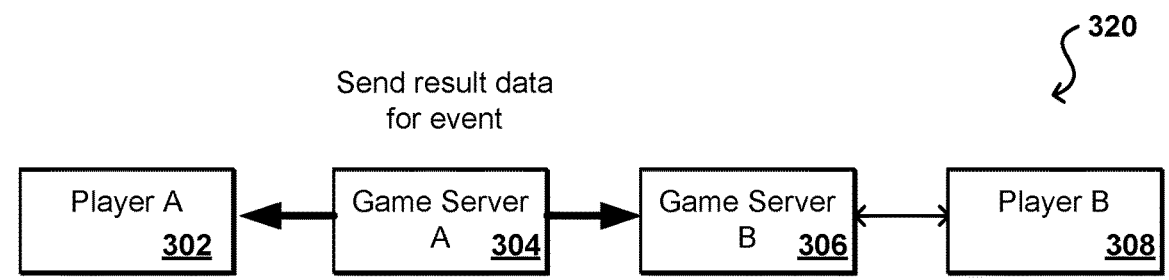
Figure 3D:
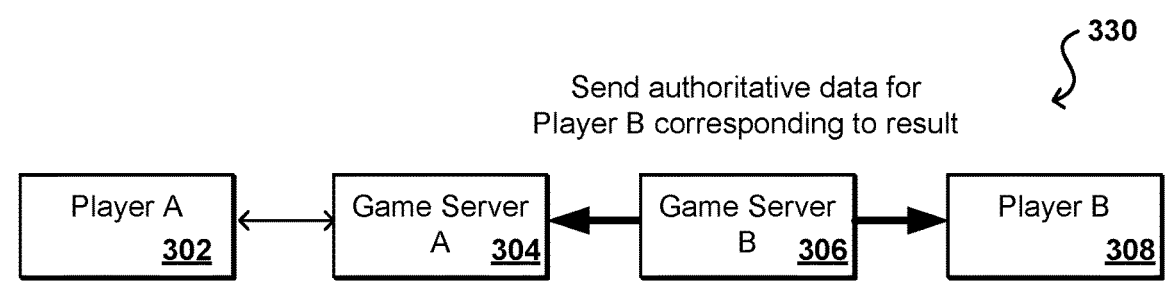
Figure 3E:
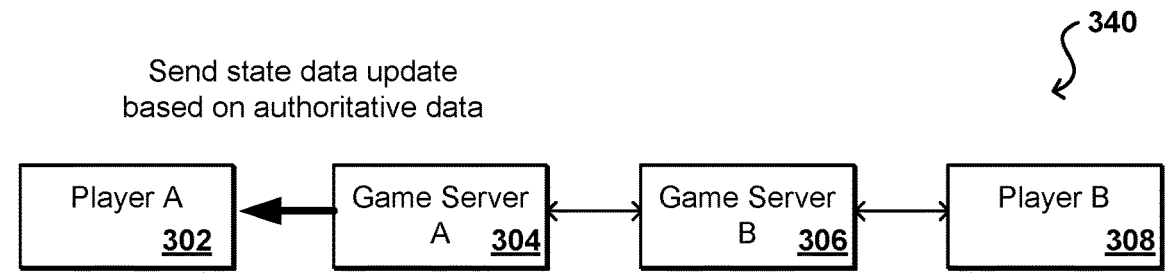

FIG. 2 illustrates an example system 200 that can be utilized to host such a game session in accordance with various embodiments. In this example a game manager 210 can be provided or allocated for each individual game or application for which at least one session is to be hosted. For at least certain types of games, the game manager 210 can manage one or more game hubs 212. A game hub 212 in the resource provider environment 204 can be utilized or provided for each unique world, instance, space, or environment to which players can connect for participating in the session. A game hub 212 can be responsible for ensuring that there is a sufficient number of game servers 214, 216, 218 to support the number of concurrent (or anticipated) players for that environment of the gaming application. This can include working with a resource manager to obtain the appropriate capacity in the appropriate locations in some embodiments as discussed elsewhere herein. In some embodiments the game hub 212 can also spawn and manage its own game servers, which as discussed elsewhere herein can correspond to machine instance or compute instances on one or more physical machines, among other such options. In some embodiments the game servers can be their own unique resource fleet within a gaming environment, with the game hub 212 configured to interact with the game manager 210 to acquire and release game servers as load demands fluctuate. In some embodiments, the game servers form a fully connected grid over a communication protocol such as the uniform data protocol (UDP) utilizing datagram transport layer security (DTLS), although many of the connections may be idle at any given time.

Player devices 102, 104, 106 can submit event data across at least one network 202 that is received to an interface layer 206 of the resource provider environment, which can direct the event data to the responsible game server for that player device with respect to the active game session. That game server can then be responsible for managing the corresponding input with respect to the active game session, which can include processing the input and propagating result data to the other game servers. The propagation in some embodiments can include replicating a call from the player device to the other servers such that the other servers can act on the input but rely upon the authority of the respective game server. The other game servers receiving the result data can then determine or verify any result or impact of the event data on game state based on the respective simulation(s). For example, the result data might indicate that player A inflicted 10 points of damage on player B, but the authoritative data would be updated to actually provide the current authoritative health score for player B after the damage is applied. Any impact data determined by one of the game servers that is authoritative can then be propagated to the other game servers for the session.

In one embodiment, the game hub 212 uses a one worker thread per core model, where both clients and game servers connect to the game hub 212 using persistent encrypted TLS connection. One listen thread can manage accepting incoming connections on the set of sockets, and can utilize round robin or another balancing approach to direct incoming connections to one of the worker threads. The worker threads can own their set of connections, with connection only ever being handled by the listen thread during an accept, and by the owning worker thread for the remainder of its lifetime. The worker threads can read and write game state from a common thread-safe shared data instance, which can itself own a game manager server session instance.

The game server instances can form a fully connected grid in one embodiment, so that any server can communicate directly with any other game server, although many of these connections may be idle as mentioned previously. A single game server can be responsible for a specific geographical region within the game world. The system can support static or dynamic partitioning of a game world across a set of servers. Each game server has authoritative control over a set of entities or resources that exist within its geographic region of interest, including the various player devices. The game servers that share neighboring geographical regions can share the state of the entities that lie along regional boundaries, for example, and can also manage the transition of entity authority between servers. Game clients or player devices (or software executing on those devices) can connect directly to the game server that has authoritative control of the player's avatar (or other representation) in the game world. If a client's in-game avatar migrates from one game server to another, the client can disconnect from the previous server and connect to the new server, and this reconnection can be managed transparently to the player and game developer without negatively impacting gameplay.

As mentioned, each game server 214, 216, 218 receiving result data from another game server can apply that result data to the local players over which that server has authority with respect to the game or environment. As mentioned, a first server receiving the input data can perform a simulation of an event, corresponding to that input, for a relevant time in the past with respect to the active session, which enables the server to effectively rewind and cause the event to be processed as of the time at which the corresponding input or trigger was received or detected. For example, the event data can include the throwing of a ball at a particular time from a particular location in the game world in a particular direction and with a particular velocity. The game server performing the simulation can simulate that action occurring at that time in the past with respect to the state of the game, as indicated by the timestamp or other indicator in the event data, and can determine any impact on the state of the game for at least one other player, such as whether the ball came into contact with a player avatar as a result of the throw. If so, the information about the contact, if that server has authority over that game state or avatar, etc., can be propagated to the other game servers such that the game servers will all have consistent game state information that is based on information from the respective authority in the game world.

FIGS. 3A through 3E illustrate such a data flow that can occur within the scope of various embodiments. In the state 300 of FIG. 3A, input is received to a device 302 for Player A, and that input is sent to Game Server A 304. In the state 310 of FIG. 3B, Game Server A 304 processes the data and performs a simulation in order to determine the impact or result of the input. Server A can use the input data to updates game state for Player A, which can be send to the device for Player A. Server A can also replicate the call with the result data to be sent to Game Server B 306, which has authority for Player B 308, as illustrated in the state 320 of FIG. 3C. Game Server B 306 processes the result data and updates game state based on any determined impact of the event data. The authoritative data corresponding to the impact can then be sent to the device for Player B 308, as illustrated in the state 330 of FIG. 3D, in order to update the state of the game as displayed on that device, as well as to Game Server A 304 to update the game state for Player A 302 and any other players for which Server A 304 has authority. In the state 340 of FIG. 3E, Game Server A 304 can send the updated and authoritative state data to the device 302 for Player A in order to update the game state for display on the device. Various other flows can be utilized as well as discussed and suggested herein. As illustrated, at no point in this process does Server A communicate directly with Player B, or Server B communicate directly with Player A.

As mentioned, many conventional game hosting approaches utilize a single server and do not provide an ability to scale across multiple servers for a given game world as do hosting approaches presented herein. Approaches to managing game state amongst the game servers as discussed herein also provides for high fidelity latency compensation. As mentioned, a game manager or other component or service can identify a single point of contact for all client devices to communicate with the relevant game server. This can involve replicating the game state information for the various player devices (or other active entities) across the various game servers. Each player device will then also receive all updates to game state, corresponding to other player actions, for example, from a single game server having authority over that device. Such an approach effective causes each game server to operate in two modes, including an authoritative mode and a proxy mode. A server proxy exists on the local game server that enables the latency diagrams to work out for hosting the various player devices concurrently using multiple game servers with replicated state information.

The game platform service 208 of FIG. 2 can provide a set of client and server libraries that provide the connectivity fabric used to build online games. It can contain latency-compensation mechanisms utilizing rewind and replay semantics that allow game events, which may have been performed hundreds of milliseconds in the past on game clients, to be accurately simulated on each game server, dramatically reducing the perception of game latency. Such a service can contain various data structures and algorithms that minimize the resource capacity and programmer effort involved in creating asynchronous gameplay logic. The service can enable a game world to be authoritatively processed by the multiple game servers, while retaining full rewind and replay semantics required for server authoritative host state rewind. The service can also utilize various banked-time algorithms to minimize simulation latencies. There is no buffering or queuing of inputs or events in at least some embodiments, as the game platform service can process inputs immediately with no risk of cheating and no noticeable temporal aliasing due to jitter in connection latency.

As used herein, a game server having "authority" over an entity can mean any of a number of things. In some embodiments, this can include the ability to modify properties or aspects of player avatars or game state corresponding to a specific player or entity. Clear authority can be important to ensure that there are not two game servers trying to modify the same properties at the same time, which might result in irreconcilable differences. Approaches in accordance with various embodiments can provide for strict access control, providing singular authority or ownership with respect to properties and their modification. Any game entity in the game world at large, or at least those relating to player avatars in some embodiments, will be authoritatively controlled at any time by only one game server or other such resource, and never more than one such resource. As mentioned, the various game servers can each operate in two different modes, including a proxy mode in which a different server has authority and is managing the update for an entity, or an authority mode in which the server is responsible for updating the entity and distributing the updated information to the other game servers, and respective clients, in the game world.

When a server receives the event data and performs the simulation, the result will be a replicated copy of the state of for one or more other players over which the server does not have authority. This information can be passed to the local devices, which can then display and interact with avatars for those other players that are based on the cloned data, not the authoritative data stored on the respective server. The player device can generate an instance of event data for an input action with respect to the avatar, such as when the player throws a ball at the avatar for the other player. The event data can include information such as the position, orientation, animation state, etc. That information is sent to the first server which has authority over that player device. Since that server does not have authoritative control over the other player, the server can indicate to the local player that the other player avatar was hit by the throw, but the server cannot modify the network properties for the other player because the authority for the other player is assigned to a different game server. In at least some embodiments a remote procedure call (RPC) will be sent between the servers indicating that the authoritative server should wield the appropriate result with respect to the other player. Since both game servers are protected behind the same backend architecture in these examples, there can be inherent trust between servers. The information from the clients is generally not treated as trusted as that information comes from outside the game environment and thus is susceptible to cheating or manipulation from the player or third parties. A server receiving such a request can apply the damage as computed by the sending server, then replicate those properties after the application back down to both the second player device and the first server, which can then propagate to the device for the player who through the ball initially.

In systems such as that illustrated in FIG. 2, the connections between the game servers in the game environment can be very low latency to allow for the server-to-server replication without significantly impacting gameplay. Even though the events are simulated as of the time they occurred to ensure accuracy and fairness, the latency should still be minimal in order to provide for smooth and consistent gameplay. Such an approach avoids gameplay impact due to buffering and other approaches used by conventional game hosting systems.

In some embodiments a hashing serializer is used for the predictive data. An auto-hashing system can process the predictive state data for a game entity being locally controlled, processing the data with a hashing serializer to generate a type of fingerprint that represents the entire predictive state for the entity. The fingerprint can then be sent for every input to the server that is authoritatively processing the data. The server processing the data can then compute a new authoritative state for the object or entity and compute a new fingerprint using the same algorithm. The hashes can then be compared, and if there is a discrepancy then the server can determine that the client is in an incorrect state. The server can then perform a serialization by copying the predictive state and sending it to the client device, whereby the client can perform the necessarily simulations to get back in sync with the game servers.

In at least some embodiments, the game manager, platform service, or other such component can work with a resource manager to obtain capacity for the game servers. There may be various considerations used for resource selection as mentioned herein. For example, the customer might provide a maximum acceptable latency threshold that must be satisfied. It might be the case, then, that available excess capacity could be used to host the game session, but that the latency cannot be guaranteed to be within the allowable limit based upon factors such as physical distance between the capacity and the players. Thus, different but more expensive capacity may need to be selected. In some embodiments there may be excess capacity available that is cheaper but comes with greater latency. There may also be limited-time capacity that is slightly more expensive, but offers better latency performance. A selection algorithm or weighted combination of factors can then be used in some embodiments to select the appropriate capacity for hosting a session. As mentioned, a customer might select to optimize for performance or cost, which can impact the selection process. The customer might also provide some criteria, such as a function that indicates the acceptable tradeoff between cost and latency. Such a function may also take into account the risk of interruption. A resource allocation manager or other such component may then generate a score for each resource option, which can then provide a ranking or other indication for the various options. In such an embodiment, the highest ranking option may be selected, where the score is based on a combination of factors that may include projected or historical latency, projected risk of interruption, and cost, for resource capacity that is able to be provided of the type and for the length of time requested. In some embodiments the cost savings might not be in a per-minute savings but in a per session savings. For example, if a prior approach sold capacity by the hour then an approach that enables a customer to buy capacity by the minute might charge more per minute, but a three minute allocation may cost significantly less than a one hour allocation. On the other hand, capacity that is not guaranteed and can be interrupted may be significantly less on a per-minute (or other measure) basis. And in some embodiments the session requests can include bid prices for each type of capacity, where the request specifies a ranking and price for each available capacity option and then the highest ranked option where the bid is a winning bid is selected for that customer session. Approaches to bidding for resource capacity are known in the art and, as such, will not be discussed herein in detail. Such an approach would expand upon the options available for bidding through such a system.

In some embodiments a customer may also be able to specify a set of instance types that can be used to support a specific type of game session. The customer can provide the relevant configuration for each, as well as the maximum latency or interruption risk values, etc. This information can be used to determine the available capacity for a session, and the individual characteristics and criteria can then be used to rank the options within that available capacity. As mentioned, the customer can also provide information as to whether to optimize for performance or cost as discussed herein. This information can be analyzed for each received request, such as for each gaming session to be hosted in a resource provider or "cloud" environment.

Figure 4:
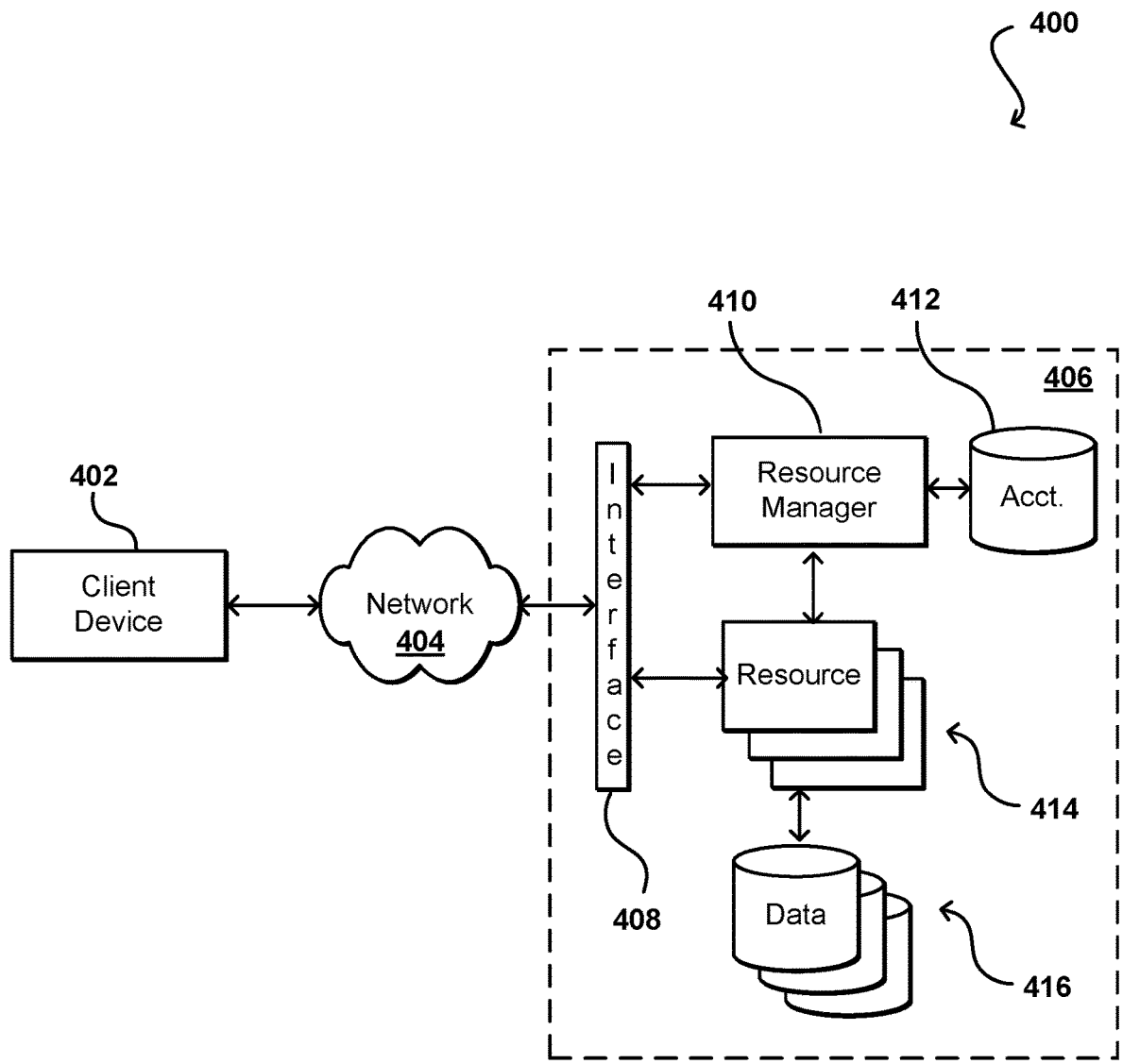
FIG. 4 illustrates an example resource environment in which various embodiments can be implemented.

FIG. 4 illustrates an example environment 400 in which aspects of the various embodiments can be implemented. In this example a user is able to utilize a client device 402 to submit requests across at least one network 404 to a multi-tenant resource provider environment 406. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 404 can include any appropriate network, including an intranet, the Internet, a cellular network, a local area network (LAN), or any other such network or combination, and communication over the network can be enabled via wired and/or wireless connections. The resource provider environment 406 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 414 of one or more types. These types can include, for example, application servers operable to process instructions provided by a user or database servers operable to process data stored in one or more data stores 416 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 414 can submit a request that is received to an interface layer 408 of the provider environment 406. The interface layer can include application programming interfaces (APIs) or other exposed interfaces enabling a user to submit requests to the provider environment. The interface layer 408 in this example can also include other components as well, such as at least one Web server, routing components, load balancers, and the like. When a request to provision a resource is received to the interface layer 408, information for the request can be directed to a resource manager 410 or other such system, service, or component configured to manage user accounts and information, resource provisioning and usage, and other such aspects. A resource manager 410 receiving the request can perform tasks such as to authenticate an identity of the user submitting the request, as well as to determine whether that user has an existing account with the resource provider, where the account data may be stored in at least one data store 412 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 402 to communicate with an allocated resource without having to communicate with the resource manager 410, at least until such time as a relevant aspect of the user account changes, the user is no longer granted access to the resource, or another such aspect changes.

The resource manager 410 (or another such system or service) in this example can also function as a virtual layer of hardware and software components that handles control functions in addition to management actions, as may include provisioning, scaling, replication, etc. The resource manager can utilize dedicated APIs in the interface layer 408, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 408 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 5:
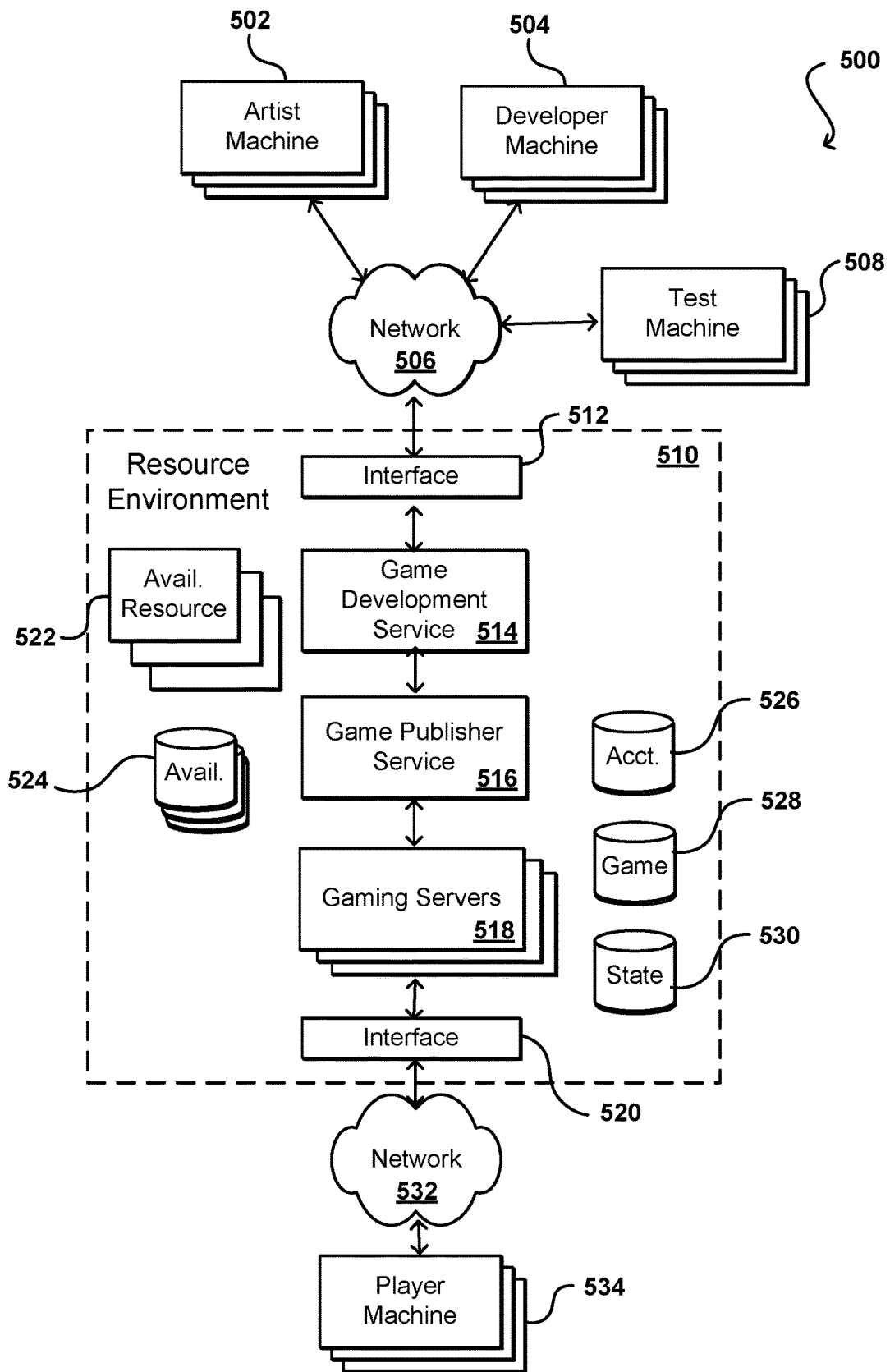
FIG. 5 illustrates an example gaming pipeline that can be used in accordance with various embodiments.

As illustrated in the example system 500 of FIG. 5, at least some of the resources can be used to support platforms and services useful in the development and providing of electronic gaming and three-dimensional graphical content, among other such options. For example, the artist machines 502 and developer machines 504 can collaborate via a game development service 514, which can be provided by a set of resources in the resource environment 510 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 528, where the repositories can include graphics files, code, audio files, and the like. The game development service 514 can also work with an account manager, or at least maintain information in an account data store 526, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like. The game development service 514 can also be used to specify criteria, such as maximum acceptable latency, that can be used to select resource capacity to host sessions for the gaming application.

Once the game development reaches an appropriate stage in the development cycle or pipeline, as may relate to alpha or beta testing, actual release or updating, etc., the appropriate content can be made accessible to a game publisher service 516. The game publisher service 516 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 504 or otherwise. In some embodiments the game content might be published and made available to one or more test machines 508, which may be associated with the customer, such that the customer can test various builds or versions of the game. In some embodiments feedback provided by the test machines 508 may be provided to the game development service 514, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 518 which can run the game and enable player machines 534 to access the game content over one or more networks 532, which may be different from the network(s) 506 used for game development. This can include, for example, dedicated gaming networks, the Internet, cellular networks, and the like. The player machines 534 can communicate with the appropriate interfaces of an interface layer 520 to obtain the gaming content. In some embodiments the player machines 532 will download the gaming content for execution on the individual machines, and will upload (or otherwise communicate) gaming data, messages, and other information to the gaming servers 518, as well as to other players, social networking sites, or other such recipients. The gaming servers 518 can cause state information for the various instances of the game to be stored to at least one game state repository. This can hold state for the game as a whole or for individual game sessions, among other such options. In some embodiments the game content can be executed by the game servers and streamed in near real time to the player machines 534. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function, whether specifically related to hosting a game session or otherwise. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the ability to utilize different types of capacity can come with a significant cost savings in at least some embodiments. For example, excess capacity or spot instances can be obtained at significant cost reduction, such as with discounts between 40% and 80% with respect to an on-demand fleet in some embodiments, depending upon the current bid rate for the capacity, among other such factors. Similarly, discounts can also be obtained for the limited time capacity, but these discounts may be less than for the excess capacity and may be at a fixed rate, such as at a 45% discount. In some embodiments the rate may depend in part upon the length of time for which the resource is requested. The additional resource options provide benefit to the customer in relation to cost and potentially performance and other aspects, while such options can provide the resource provider with flexibility in the types of instances used and the ability to place a hosted game server into a region that may be closer to the player than might otherwise be possible, potentially improving latency and other such characteristics. The flexibility can also help the resource provider to rebalance capacity as appropriate. As mentioned, potential tradeoffs for the customer are the potential for excess capacity instances to be interrupted, or for games to time out if hosted on limited time instances. Further, since excess capacity for a particular type of resource may be insufficient at the time of a request, a customer can specify multiple acceptable instance types with appropriate configurations that can be used to host the game session. A customer might then provide selection criteria or preferences, such as to select the available type with the lowest cost, highest performance, or lowest risk of interruption, among other such options. A customer in some embodiments might also provide priority selections with respect to the geographic locations of the resources. The flexibility of instance type can also reduce the amount of time needed to initiate a game session, particularly where some instance types can be queued up for such hosting when capacity is available. In some embodiments a resource console can be used to manage the various instance options.

In some embodiments, a ranking may not be used to select the appropriate resource capacity. Instead there may be a start point for the search, which may continue until an appropriate type of resource capacity is located. For example, a resource management service or game hosting service might determine the locations of players to a game session, and determine a location for potential resource capacity that is closest to those players or would offer reduced latency or otherwise improved performance. In such an approach, an instance can be selected as soon as one is found that satisfies the various hosting criteria, in order to start the game more quickly. The search can continue and extend to different locations until appropriate capacity is located.

Figure 6:
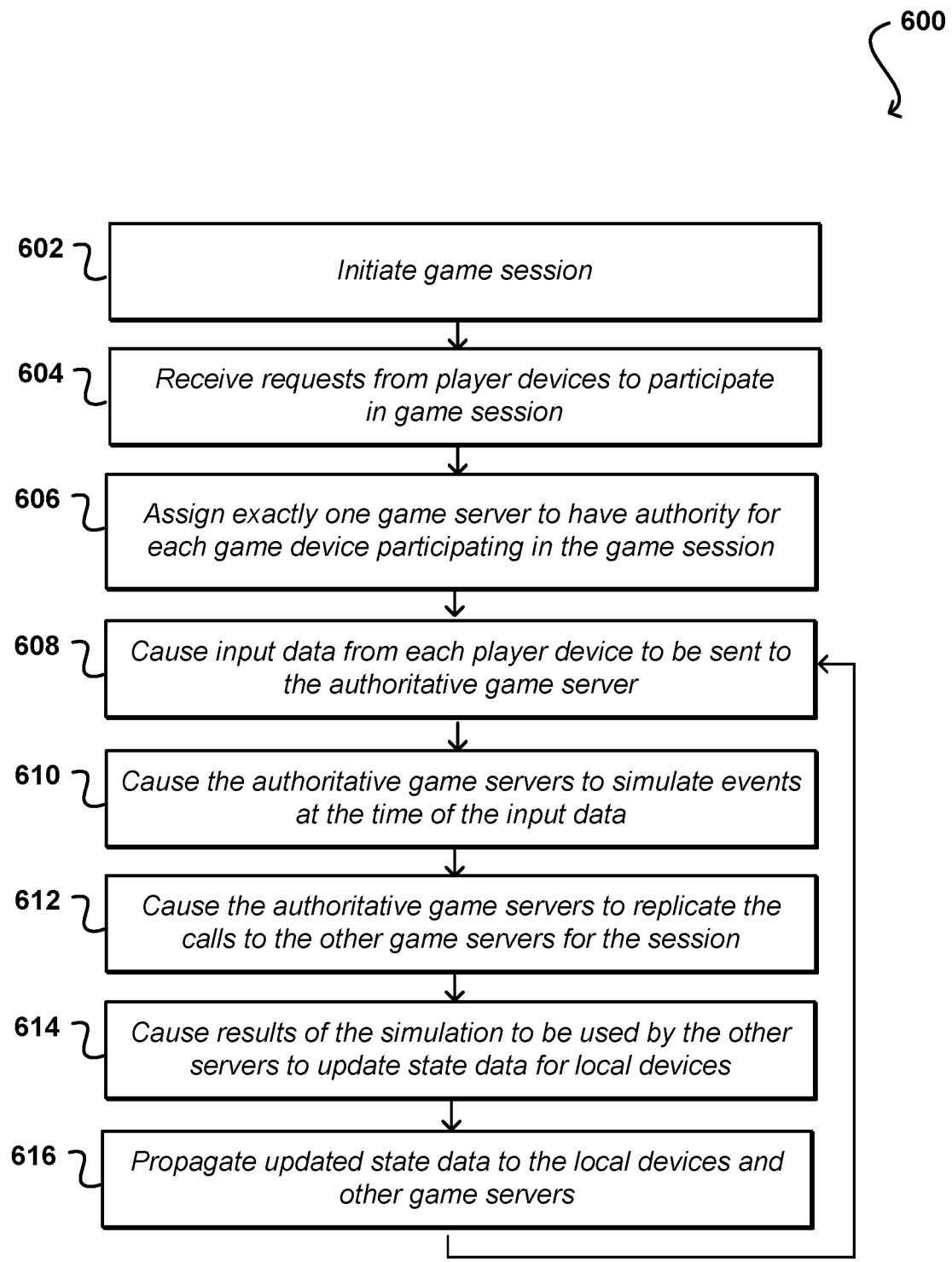
FIG. 6 illustrates an example process for managing game state for a large number of players that can be utilized in accordance with various embodiments.

FIG. 6 illustrates an example process 600 for managing game state for a large number of player devices that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a game session is initiated 602 using a set of game servers in a game hosting environment. The session can be initiated by a game provider or in response to a player request, among other such options. As mentioned, the session can include one or more worlds or environments, each of which may have a dedicated set of resources to manage state for the active game session. Requests from various player devices may be received 604 to participate in the session. There may be some authentication or authorization checks performed in at least some embodiments where accounts or other identities may be required to participate in the session. For each player device added to the session in this example there is exactly one game server assigned 606 to have authority over that player device. This can include, for example, the ability to modify game parameters for an avatar associated with a player of the player device.

During gameplay the players will provide various inputs to their respective player devices. Input data from the player devices can be caused 608 to be sent to, or received by, the respective game servers having authority for those player devices, where each device only communicates with its authoritative game server. The authoritative game servers can process the input data for the associated player devices. The game servers can also be caused 610 to simulate events at the time of the input per the received input data. This can include effectively rewinding time to the time of the timestamp and simulating the input data from the respective player devices to determine an impact on the game state, particularly with respect to player devices over which a game server has authority. The authoritative game servers can then be caused 612 to replicate the calls to the other game servers for the active game session. Those game servers in turn can be caused 614 to use results of the simulation update state data for the local devices, and the updated state data can be propagated 616 to those local devices as well as the other game servers, such that all the game servers are synchronized with accurate and authoritative game state data for the session.

Figure 7:
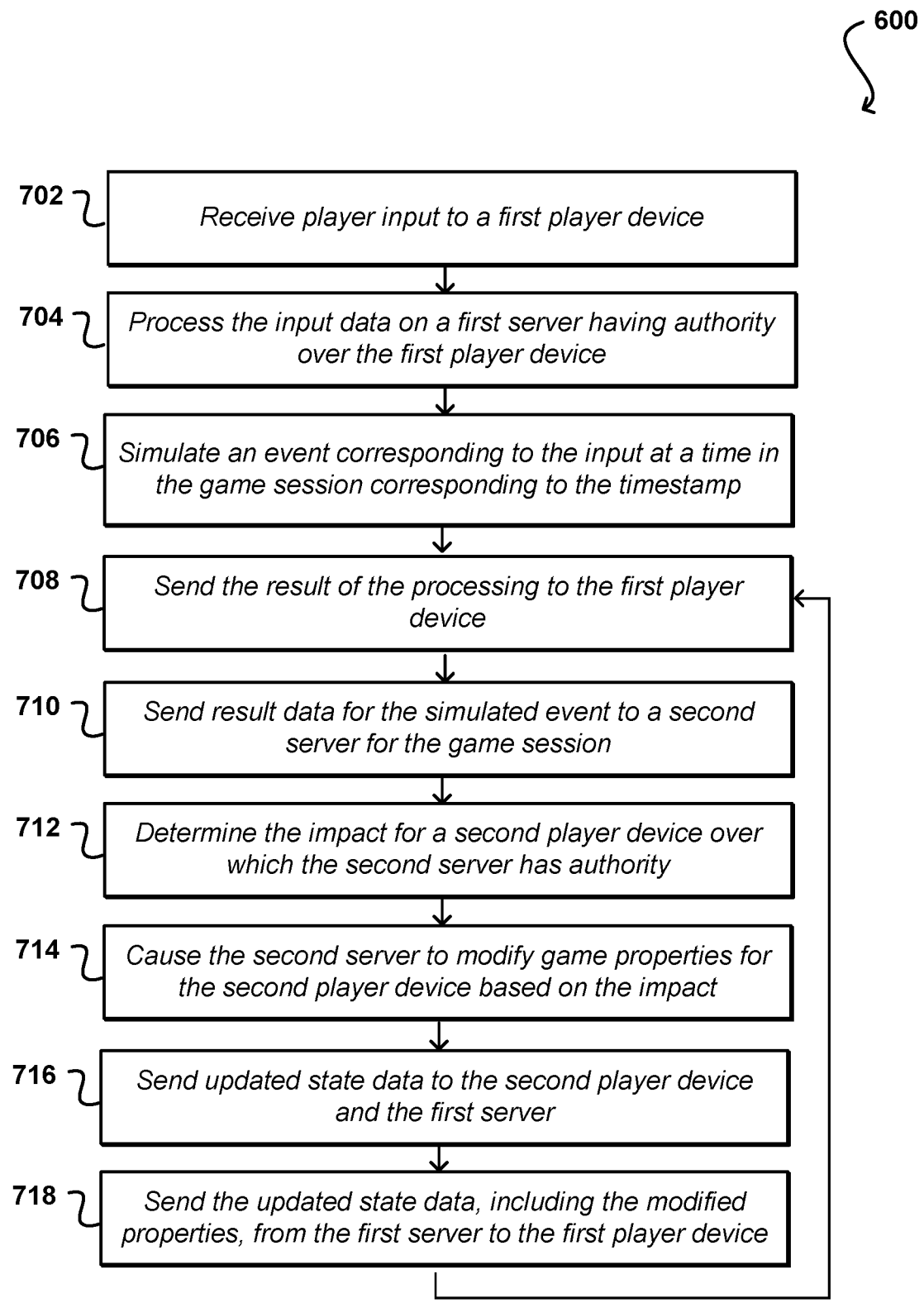
FIG. 7 illustrates an example process for managing game state for multiple players to an active session that can be utilized accordance with various embodiments.

FIG. 7 illustrates an example process 700 for managing game state for a game session with a large number of players that can be utilized in accordance with various embodiments. In this example, player input is received 702 to a first player device, such as from a player to a client application executing on the first player device. The input data can be sent to a first server having authority over the first player device, which can process 704 the input data. As mentioned, this can include determining an impact or result of the input for the current game state and modifying one or more game properties associated with the respective player. In at least some embodiments this involves simulating 706 an event corresponding to the input data as of a time of an associated timestamp. This can include, for example, virtually rewinding the state of the game session to that point in time and simulating the input to determine any potential outcome or impact on the state of the game. The result of the simulation can be sent 708 back to the first player device. The first server can also send 710 result data from the simulation to at least a second server for the game session. The second server can be one of a set of game servers, other than the first game server, not having authority over, or being able to communicate directly with, the first player device. The second server and other servers can each have authority over a respective set of player devices, however, as discussed elsewhere herein. Although shown in sequence, the sending of information from the first server to the first player device and second server can happen in parallel in various embodiments.

A game server receiving event data from another server can analyze the result data to determine 712 the impact for at least a second player device over which the second player has authority, such as may relate to a change in state of a player avatar in the game session. The second server can be caused 714 to modify one or more game properties for the second player device based at least in part upon the determined impact. The updated state data can be sent 716 from the second game server to the second player device, as the second player device is only able to communicate directly with the second game server. The updated state data, including the modified properties, can also be sent to the first game server. The first game server can then send 718 the updated state data to the first player device, providing authoritative game state data for the other players or entities in the active game session. The process can continue during the game session, and new players can be assigned to specific game servers, based upon factors such as proximity and capacity. The number or selection of game servers for a session can also vary over time, as may relate to the number or locations of players, etc.

Figure 8:
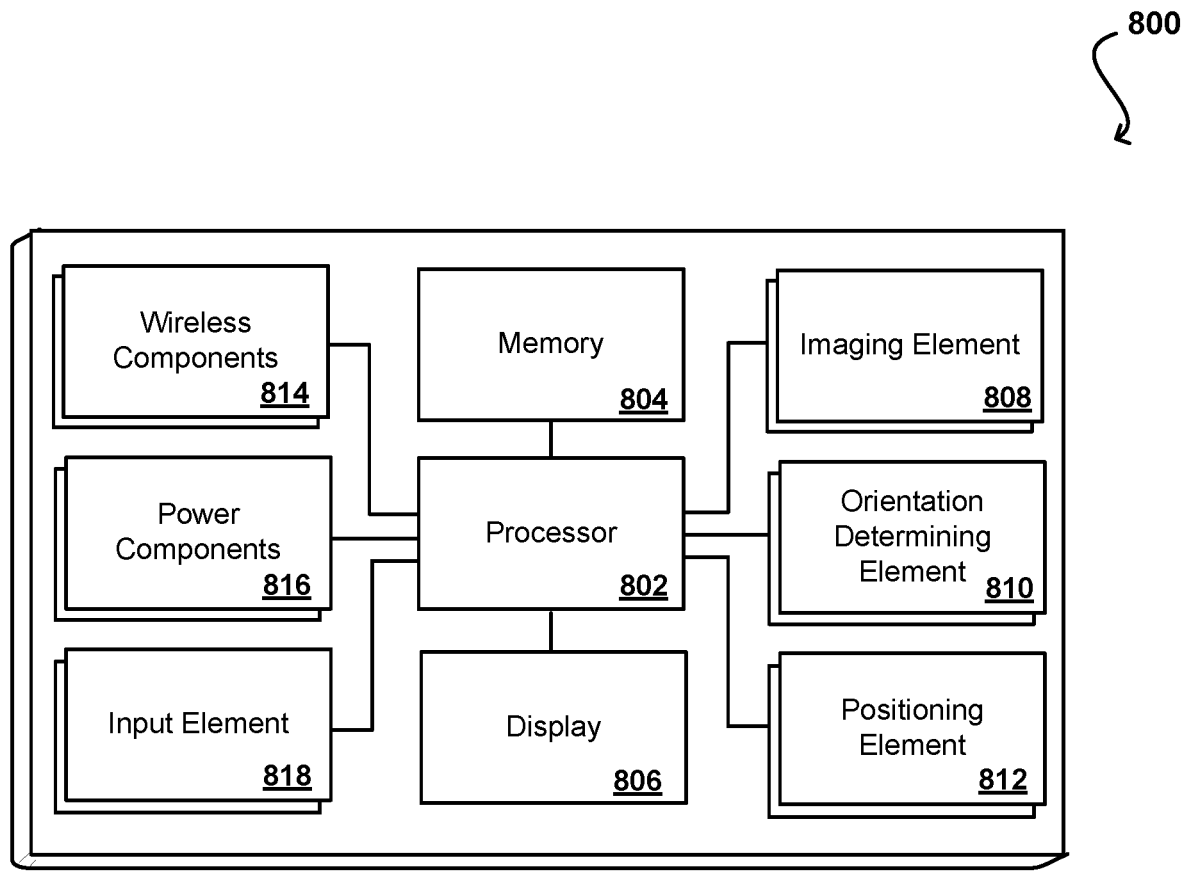
FIG. 8 illustrates example components of a computing device that can be used to implement aspects of the various embodiments.

FIG. 8 illustrates a set of basic components of an electronic computing device 800 that can be utilized to implement aspects of the various embodiments. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices. The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving, by a first server having authority over a state of the game for a first player device, from the first player device participating in an active game session, event data including a timestamp for game input received by the first player device, wherein the game session is part of an interactive, multiplayer, and online simulation game, and wherein the timestamp indicates a previous game time, corresponding to a previous state of an active game session on the first server, that was executing on the first player device when the game input was received by the first player device;
    causing the first server to simulate an event, corresponding to the game input, for the previous state of the active game session based on the timestamp;
    causing the first server to send result data for the simulated event to at least a second server having authority over a state of the game for at least a second player device, the result data including a game state corresponding to when the event was simulated;
    causing the second server to update the state of the game for the second player device based at least in part upon the result data, wherein the update includes the second server simulating the event to occur at the previous state of the game;
    causing the second server to send updated state data for the second player device to the second player device and to the first server;
    causing the first server to update the state of the game for the first player device based at least in part upon the updated state data for the second player device; and
    causing the second player device to execute the updated state data when a state of the game at the second player device is the previous state of the active game session.

2. The computer-implemented method of claim 1, further comprising:
    causing the first player device to determine initial result data before the state of the game for the first player device is updated based at least in part upon the updated state data for the second player device.

3. The computer-implemented method of claim 1, further comprising:
    causing the second server to modify one or more game properties for a player avatar corresponding to the second player device in response to the result data, the one or more game properties for the player avatar unable to be modified by game servers other than the second server.

4. The computer-implemented method of claim 3, further comprising:
    using a hashing serializer to generate a fingerprint representing a predictive state for the player avatar for transmission to the first server.

5. The computer-implemented method of claim 1, further comprising:

causing the first server to send a remote procedure call (RPC) to the second server indicating an action to be taken in response to the event data.

6. A computer-implemented method, comprising:

receiving, by a first server having authority over session states for a first client device, from the first client device participating in an active session, event data for input received to the first client device, wherein the active session is part of an interactive, multiplayer, and online simulation game, and wherein the event data indicates a prior session state of the active session that was executing on the first client device when the game input was received by the first client device;

causing the first server, to simulate an event, specified by the event data, in order to update the session state for the first client device, wherein the update occurs at the prior session state with respect to a current session state for the first server;

sending result data for the simulated event to a second server having authority over the session state for a second client device;

causing the second server to update the session state for the second client device, wherein the update includes the second server simulating the event to occur at a session state for the second client device corresponding to the prior session state; and causing the second server to execute the game using the updated state data when a state of the game for the second client device is the prior state of the active game session.

7. The computer-implemented method of claim 6, further comprising:

causing the second server to send the updated session state for the second client device to the first server; and causing the first server to update the state for the first client device based at least in part upon the updated session state for the second client device.

8. The computer-implemented method of claim 6, further comprising:

causing the first server to simulate the event for a past time in the active session specified by the event data.

9. The computer-implemented method of claim 6, further comprising:

initiating the active session;

determining at least one of a number or a location of client devices anticipated to participate in the active session; and allocating a set of servers, including the first server and the second server, to manage the session state for the client devices.

10. The computer-implemented method of claim 9, further comprising:

receiving a request for an additional client device to participate in the active session; and assigning a selected server of the set of servers to have authority to modify the session data for the additional client device, the additional client device only able to communicate with the selected server from among the set of servers.

11. The computer-implemented method of claim 6, further comprising:

causing the second server to modify one or more application properties for an application entity corresponding to the second client device in response to the result data, the one or more application properties for the application entity unable to be modified by application servers other than the second server.

12. The computer-implemented method of claim 11, further comprising:

using a hashing serializer to generate a fingerprint representing a predictive state for the application entity avatar for transmission to the first server.

13. The computer-implemented method of claim 6, further comprising:

causing the first server to send a remote procedure call (RPC) to the second server indicating an action to be taken in response to the event data.

14. The computer-implemented method of claim 6, further comprising:

providing a set of rewind and replay semantics for use in simulating the event via the first server.

15. The computer-implemented method of claim 6, further comprising:

generating, from simulating the event on the first server, a replicated copy of state data for one or more application entities over which the first server does not have authority; and causing the first server to pass the replicated copy to the first client device and any other client devices over which the second server has authority.

16. A system, comprising:

at least one processor; and memory including instructions that, when executed by the at least one processor, cause the system to:

receive, by a first server having authority over session states for a first client device, from the first client device participating in an active session, event data for input received to the first client device, wherein the active session is part of an interactive, multiplayer, and online simulation game, wherein the event data indicates a prior session state of the active session that was executing on the first client device when the game input was received by the first client device;

cause the first server, to simulate an event, specified by the event data, in order to update the session state for the first client device, wherein the update occurs at the prior session state with respect to a current session state for the first computing device;

send result data for the simulated event to a second server having authority over the session state for a second client device;

cause the second server to update the session state for the second client device, wherein the update includes the second server simulating the event to occur at a session state for the second computing device corresponding to the prior session state; and cause the second client device to execute the updated session state when a state of the game at the second client device is the prior state of the active game session.

17. The system of claim 16, wherein the instructions when executed further cause the system to:

cause the second server to send the updated session state for the second client device to the first server; and cause the first server to update the state for the first client device based at least in part upon the updated session state for the second client device.

18. The system of claim 16, wherein the instructions when executed further cause the system to:

cause the first server to simulate the event for a past time in the active session specified by the event data.

19. The system of claim 16, wherein the instructions when executed further cause the system to:

cause the second server to modify one or more application properties for an application entity corresponding to the second client device in response to the result data, the one or more application properties for the application entity unable to be modified by application servers other than the second server.

20. The system of claim 16, wherein the first server and the second server are members of a set of game servers hosting a game session.

\* \* \* \* \*